United States Patent
Bekasi

(10) Patent No.: US 8,410,761 B2
(45) Date of Patent: Apr. 2, 2013

(54) LOW-LOSS ZERO CURRENT SWITCHING SHUNT REGULATOR FOR AC ALTERNATOR

(75) Inventor: Thomas Bekasi, Meriden, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 138 days.

(21) Appl. No.: 12/848,248

(22) Filed: Aug. 2, 2010

(65) Prior Publication Data

US 2012/0025788 A1 Feb. 2, 2012

(51) Int. Cl.
*H02P 9/00* (2006.01)
*H02P 11/00* (2006.01)

(52) U.S. Cl. .................. 322/44; 322/20; 322/24

(58) Field of Classification Search ............ 322/24, 322/20, 44, 28, 68, 69, 93; 363/132
See application file for complete search history.

(56) References Cited

U.S. PATENT DOCUMENTS

| | | | |
|---|---|---|---|
| 3,453,517 A * | 7/1969 | Kennedy et al. | 318/257 |
| 4,006,399 A * | 2/1977 | Studtmann | 322/47 |
| 4,381,531 A * | 4/1983 | Eisenhauer | 361/87 |
| 5,013,929 A | 5/1991 | Dhyanchand | |
| 5,015,941 A | 5/1991 | Dhyanchand | |
| 5,023,572 A | 6/1991 | Caldwell et al. | |
| 5,068,590 A | 11/1991 | Glennon et al. | |
| 5,086,266 A | 2/1992 | Shiga et al. | |
| 5,179,511 A * | 1/1993 | Troyk et al. | 363/97 |
| 6,081,084 A * | 6/2000 | Crecelius | 318/400.35 |
| 6,181,112 B1 | 1/2001 | Latos et al. | |
| 7,224,147 B2 | 5/2007 | Shah et al. | |
| 7,408,327 B2 | 8/2008 | Shah et al. | |
| 7,592,784 B2 | 9/2009 | Qi et al. | |
| 7,652,900 B2 * | 1/2010 | Fukaya et al. | 363/132 |
| 2005/0052808 A1 * | 3/2005 | Nguyen | 361/100 |
| 2006/0250114 A1 * | 11/2006 | Faberman et al. | 322/24 |
| 2009/0046490 A1 * | 2/2009 | Lumsden | 363/124 |
| 2010/0073977 A1 * | 3/2010 | Nakamoto et al. | 363/126 |
| 2011/0204856 A1 * | 8/2011 | Horihata | 322/27 |

* cited by examiner

*Primary Examiner* — Julio Gonzalez
(74) *Attorney, Agent, or Firm* — Carlson, Gaskey & Olds, PC

(57) ABSTRACT

A control circuit for use with an AC alternator has a plurality of outlet lines leading from the alternator, each receiving a phase of current generated by the alternator. Tap lines are associated with each of the power lines and are associated with a switch. The switches drain power to a drain when in a first state, and allow the power to pass downstream to a system load when in a second state. A switch control changes the switches between the first and second state. A detector detects when the current signal is approaching a zero crossing between a cycle positive portion and a negative portion. The switch control takes in the information with regard to the approaching zero crossing, and change the switches between the first and second states based upon the detected zero crossing point. An alternator is also disclosed.

19 Claims, 2 Drawing Sheets

LOW-LOSS ZERO CURRENT SWITCHING SHUNT REGULATOR FOR AC ALTERNATOR

BACKGROUND

This application relates to a current switching shunt regulator for an alternator control circuit of the sort which drains or shunts the current in a negative phase of an AC output, and passes the positive wave downstream to a system load. The positive wave is also shunted at random times to regulate the resultant output voltage.

Alternators are known, and generate an AC current, which is passed through a control regulator. In one known type of control regulator, a constant frequency, pulse width modulated shunt regulator is utilized. The known pulse width modulated shunt regulator uses pulse width modulation control to shunt the alternator at random times. At that point, the MOSFETs internal body diode will shunt the negative portion of the cycle. The MOSFETs are closed when the output voltage is over range and occurs at random times during the positive and negative portions of the cycle.

While systems which utilize the above base strategy have been widely utilized, there is resultant switch noise and power loss inherent in such an approach.

SUMMARY

A control circuit for use with an AC alternator has a plurality of outlet lines leading from the alternator, each receiving a phase of current generated by the alternator. Tap lines are associated with each of the power lines and are associated with a switch. The switches drain power to a drain when in a first state, and allow the power to pass downstream to a system load when in a second state. A switch control changes the switches between the first and second state. A detector detects when the current signal is approaching a zero crossing between a cycle positive portion and a negative portion. The switch control takes in the information with regard to the approaching zero crossing, and change the switches between the first and second states based upon the detected zero crossing point. An alternator is also disclosed.

These and other features of the present invention can be best understood from the following specification and drawings, the following of which is a brief description.

DETAILED DESCRIPTION

Figure 1:
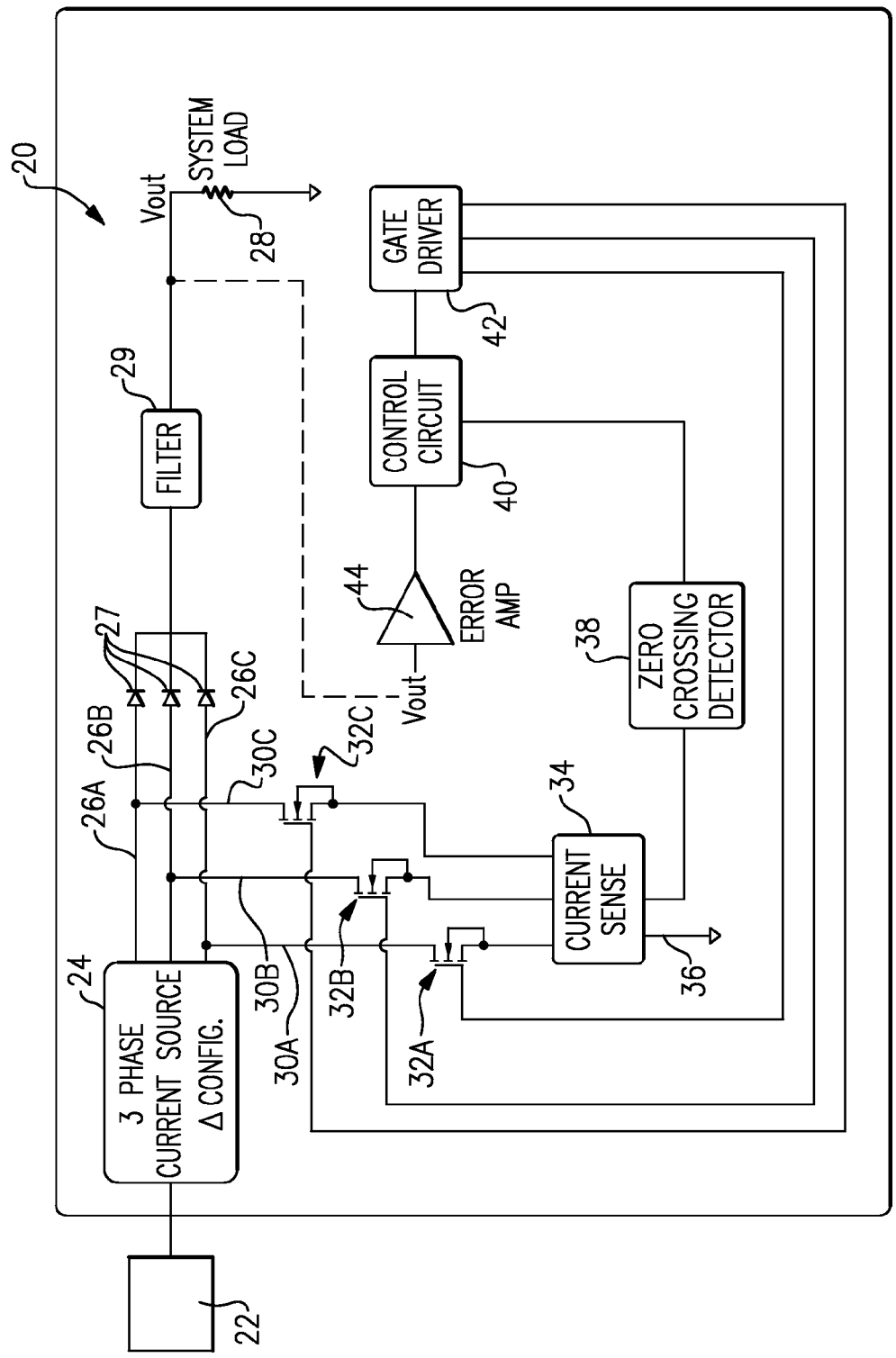
FIG. 1 schematically shows a circuit incorporating the embodiment.
Figure 2:
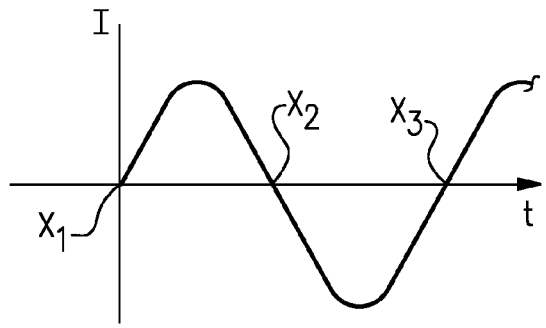
FIG. 2 graphically shows a current signal.

FIG. 1 shows a circuit 20 which is utilized as a control circuit for the power delivered from an alternator 22. The power from the alternator 22 is part of a current source 24 within circuit 20. The current is three-phase in this embodiment. However, other number of phases would come within the scope of this application.

As shown, three power lines 26A, 26B, and 26C pass downstream, and through diodes 27, and to a filter 29. Tap lines 30A, 30B, and 30C selectively attach MOSFETs 32A, 32B, and 32C. The MOSFETs all selectively communicate with a current sense 34. A gate driver 42 selectively opens and closes the MOSFETs 32A-32C.

Known gate drivers close MOSFETs associated with such a system to drain or shunt the negative portion of the current signal. In the past, such a gate driver has been controlled with pulse width modulation, which simultaneously closes all the MOSFETs at random times. This has resulted in switch noise and power loss.

In the circuit 20, an individual current sense 34 is incorporated which senses the current passing downstream through each MOSFET 32A-32C to the sink 36, and communicates the current with a zero crossing detector 38. The zero crossing detector 38 detects the crossing of zero in any number of known ways. This detector could be a resistive device where a proportional voltage is measured or a current sense transformer. Downstream of the zero crossing detector 38, the information is provided to control circuit 40. At the same time, the downstream $V_{out}$ being delivered to a system load 28 is monitored, and provides a signal into an error amplifier 44. If the voltage $V_{out}$ is higher than a desired voltage, then a signal is sent to the control circuit 40 that some positive portion of the current signal should also be drained.

Figure 3:
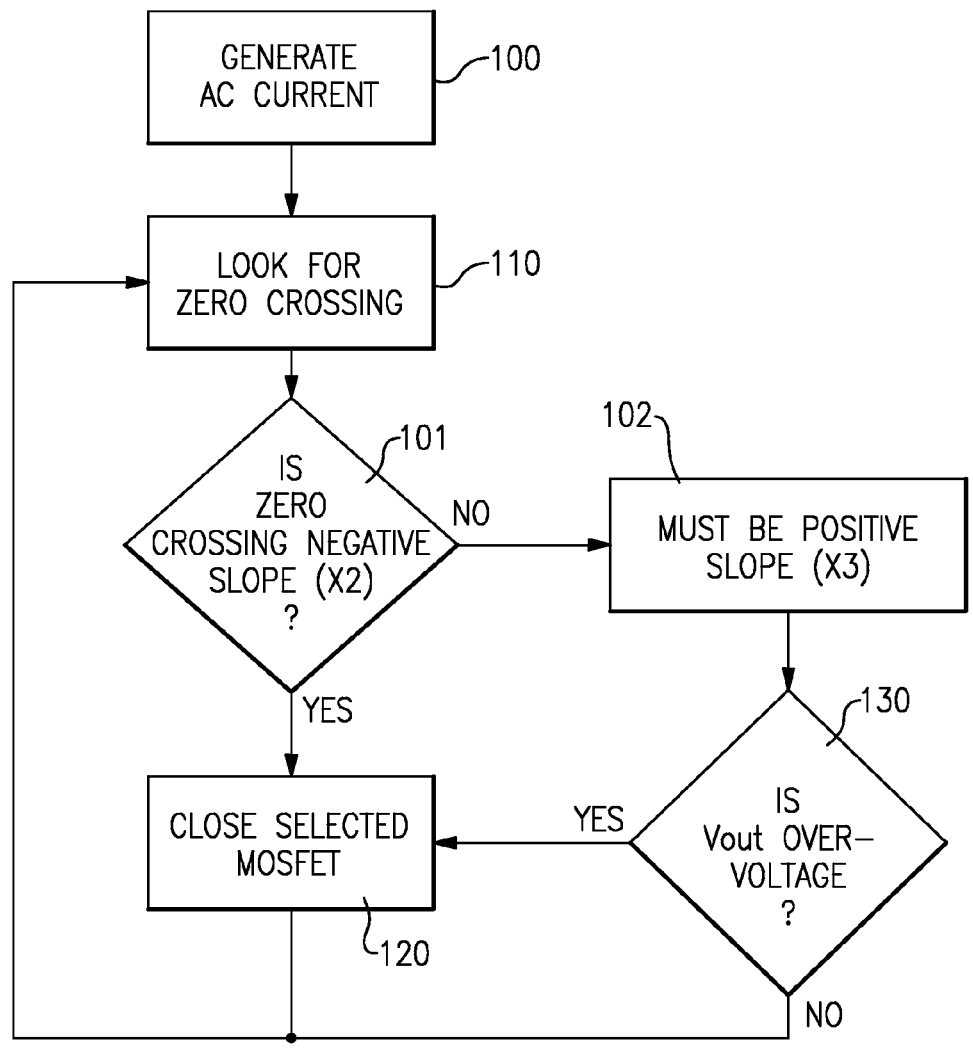
FIG. 3 is a flow chart of the disclosed approach.

The design has two modes of operation depending upon the current flow thru each MOSFET 32A-32C. This should be read in combination with FIG. 3.

During operation, alternator 22 generates AC current (step 100). The disclosed method looks for zero crossing points in the AC signal (step 110).

MODE ONE: When a negative zero crossing is detected, state X2 (step 101), that particular MOSFET 32A-32C is closed (step 120). When a MOSFET 32A-32C is in the ON or closed state, the effective resistance is extremely small thereby resulting in very low power dissipation in the MOSFET 32A-32C. In previous designs, the internal body diode of the MOSFET 32A-32C carried the negative current thus creating excessive power losses. It should be noted that each MOSFET 32A-32C can be enabled/disabled independently.

MODE TWO: When a positive zero crossing is detected, state X3 (step 102), a comparator in the control circuit 40, will determine if Vout is over the desired voltage level (step 130). If Vout is greater than the desired level, that particular MOSFET will remain closed (enabled) and the positive current is shunted back to the alternator (step 120). If Vout is below the desired level, the MOSFET 32A-32C will open and the current from the alternator is steered to the system load 28 by diodes 27.

Since the MOSFET 32A-32C is switched during the near zero current condition resulting in very low power dissipation in the MOSFET 32A-32C, minimal production of high frequency switching noise occurs.

The gate driver 42 contains a MOSFET 32A-32C gate driver for each of the MOSFET 32A-32C. It should be noted that the disclosed circuit is being used with a 3-phase alternator but any multiple of windings could be accounted for by matching a MOSFET 32 and diode 27 with each winding.

In its most efficient embodiment, the point to change between the switches being opened and closed occurs exactly at the zero crossing point. Of course there can be some flexibility in the exact crossing point. This application would extend to any such system wherein an actual zero crossing point is detected to be utilized as a trigger point between opening and/or closing the MOSFETs 32A-32C, even if the switching occurs slightly spaced from that point.

While specific types of electronic circuit components have been disclosed, any number of other equivalent components could be utilized. That is, other type switches may be utilized instead of the MOSFETs. Further, other components rather than the error amplifier 44, filter 29, diodes 27, etc., may be utilized.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A control circuit for use with an AC alternator comprising:
   a plurality of outlet lines leading from the alternator, and for each receiving a phase of current generated by the alternator;
   tap lines associated with each of said outlet lines, said tap lines each being associated with a switch, and a current sense for sensing a current in each of said tap lines and sending a current signal for each of said tap lines;
   said switches being operable to drain power to a drain when in a first state, and to allow the power to pass downstream to a system load as needed when in a second state;
   a switch control for controlling the switches to change between the first and second state; and
   a detector for detecting when each said current signal is approaching a zero crossing between a positive portion and a negative portion, and said switch control being operable to take in the information with regard to the approaching zero crossing, and change one of the switches associated with a particular tap line having the current signal approaching the zero crossing, between the first and second states.

2. The circuit as set forth in claim 1, wherein said switches are MOSFETs.

3. The circuit as set forth in claim 1, wherein said switch control is a gate driver and a control circuit.

4. The circuit as set forth in claim 1, wherein a zero crossing detector is positioned to receive signals from said tap lines to identify the zero crossing points.

5. The circuit as set forth in claim 4, wherein a current sense is positioned between said switches and said zero crossing detector, and downstream of said switches to provide the information to said control circuit.

6. The circuit as set forth in claim 1, wherein an output voltage is detected downstream of said tap lines, and is fed back to the switch circuit, said switch circuit providing additional control to maintain said output voltage below a predetermined limit.

7. The circuit as set forth in claim 6, wherein said switch control is operable to drain both portions of said current signal to reduce the output voltage should the output voltage be greater than the predetermined limit.

8. The circuit as set forth in claim 1, wherein said switch control is operable to drain the negative portion of the current signal, and pass the positive portion of the current signal downstream.

9. The circuit as set forth in claim 1, wherein the switch control changes the switches between the first and second states at the zero crossing.

10. A combined alternator and control circuit comprising:
    an alternator for generating AC current, a plurality of outlet lines leading from the alternator, and each for receiving a phase of current generated by the alternator, and passing said phase downstream toward a system load;
    tap lines associated with each of said output lines, said tap lines each being associated with a switch, and a current sense for sensing a current in each of said tap lines, and sending a current signal for each of said tap lines;
    said switches being operable to drain power to a drain when in a first state, and to allow the power to pass downstream to a system load when in a second state;
    a switch control for controlling the switches to change between the first and second state; and
    a detector for detecting when each said current signal is approaching a zero crossing between a positive portion and a negative portion, and said switch control being operable to take in the information with regard to the approaching zero crossing, and change one of the switches associated with a particular tap line having the current signal approaching the zero crossing, between the first and second states.

11. The combination as set forth in claim 10, wherein said switches are MOSFETs.

12. The combination as set forth in claim 10, wherein said switch control is a gate driver and a control circuit.

13. The combination as set forth in claim 10, wherein a zero crossing detector is positioned to receive signals from said tap lines to identify the zero crossing points.

14. The combination as set forth in claim 13, wherein said a-current sense is positioned between said switches and said zero crossing detector, and downstream of said switches to provide the information to said control circuit.

15. The combination as set forth in claim 10, wherein an output voltage is detected downstream of said tap lines, and is fed back to the switch circuit, said switch circuit providing additional control to maintain said output voltage below a predetermined limit.

16. The combination as set forth in claim 15, wherein said switch control is operable to drain both portions of said current signal to reduce the output voltage should the output voltage be greater than the predetermined limit.

17. The combination as set forth in claim 10, wherein said switch control is operable to drain the negative portion of the current signal, and pass the positive portion of the current signal downstream.

18. The combination as set forth in claim 10, wherein the switch control changes the switches between the first and second states at the zero crossing.

19. A control circuit for use with an AC alternator comprising:
    a plurality of outlet lines leading from the alternator, and for each receiving a phase of current generated by the alternator;
    tap lines associated with each of said outlet lines, said tap lines each being associated with a switch, and a current sense for sensing a current and sending a current signal;
    said switches being operable to drain power to a drain when in a first state, and to allow the power to pass downstream to a system load as needed when in a second state;
    a switch control for controlling the switches to change between the first and second state;
    a detector for detecting when the current signal is approaching a zero crossing between a positive portion and a negative portion, and said switch control being operable to take in the information with regard to the approaching zero crossing, and change the switches between the first and second states; and
    an output voltage is detected downstream of said tap lines, and is fed back to the switch circuit, said switch circuit providing additional control to maintain said output voltage below a predetermined limit, and being operable to drain both portions of said current signal to reduce the output voltage should the output voltage be greater than the predetermined limit.

* * * * *